United States Patent
Veitch et al.

(10) Patent No.: US 10,865,806 B2
(45) Date of Patent: Dec. 15, 2020

(54) MISTUNED ROTOR FOR GAS TURBINE ENGINE

(71) Applicant: PRATT & WHITNEY CANADA CORP., Longueuil (CA)

(72) Inventors: Thomas Veitch, Scarborough (CA); Farid Abrari, Mississauga (CA); Ernest Adique, Brampton (CA); Daniel Fudge, Vaughan (CA); Kari Heikurinen, Oakville (CA); Paul Stone, Guelph (CA); Ignatius Theratil, Mississauga (CA); Peter Townsend, Mississauga (CA); Tibor Urac, Mississauga (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 115 days.

(21) Appl. No.: 15/706,247

(22) Filed: Sep. 15, 2017

(65) Prior Publication Data
US 2019/0085704 A1    Mar. 21, 2019

(51) Int. Cl.
F04D 29/32 (2006.01)
F04D 29/66 (2006.01)
F01D 5/14 (2006.01)

(52) U.S. Cl.
CPC ........... F04D 29/327 (2013.01); F01D 5/141 (2013.01); F04D 29/666 (2013.01);
(Continued)

(58) Field of Classification Search
CPC . F01D 5/141; F01D 5/16; F01D 5/027; F01D 5/10; F05D 2260/961; F04D 29/666; F04D 29/668; F04D 29/327
(Continued)

(56) References Cited

U.S. PATENT DOCUMENTS

| 3,536,417 A | 10/1970 | Merkle et al. |
| 3,758,233 A | 9/1973 | Newman |

(Continued)

FOREIGN PATENT DOCUMENTS

| DE | 102009033618 | 1/2011 |
| EP | 1211382 | 6/2002 |

(Continued)

OTHER PUBLICATIONS

Smith, Hubert. The Illustrated Guide to Aerodynamics. TAB Books. 2nd Edition. p. 21. (Year: 1992).*

(Continued)

Primary Examiner — Richard A Edgar
(74) Attorney, Agent, or Firm — Norton Rose Fulbright Canada LLP

(57) ABSTRACT

A rotor for a gas turbine engine. The rotor includes blades circumferentially distributed around a hub. The blades have airfoils with a span defined between a root and tip, a chord defined between a leading edge and a trailing edge, and a thickness defined between a pressure side surface and suction side surface. The blades include first blades and second blades. The airfoil of the first blades has a first thickness distribution defining a first natural vibration frequency of the airfoils of the first blades. The airfoil of the second blades has a second thickness distribution defining a second natural vibration frequency different than the first natural vibration frequency. The first thickness distribution is different than the second thickness distribution along a radially-inner half of the span, and the first thickness distribution matches the second thickness distribution along a radially-outer half of the span.

14 Claims, 5 Drawing Sheets

(52) U.S. Cl.
CPC ...... *F04D 29/668* (2013.01); *F05D 2240/301* (2013.01); *F05D 2260/961* (2013.01)

(58) Field of Classification Search
USPC .................................................. 416/203, 175
See application file for complete search history.

(56) References Cited

U.S. PATENT DOCUMENTS

| | | | |
|---|---|---|---|
| 4,492,522 A | 1/1985 | Rossmann et al. | |
| 5,286,168 A | 2/1994 | Smith | |
| 5,667,361 A | 9/1997 | Yaeger et al. | |
| 6,042,338 A | 3/2000 | Brafford et al. | |
| 6,059,533 A | 5/2000 | Stoker et al. | |
| 6,379,112 B1 | 4/2002 | Montgomery | |
| 7,354,243 B2 | 4/2008 | Harvey | |
| 7,690,890 B2 | 4/2010 | Aotsuka et al. | |
| 8,043,063 B2 * | 10/2011 | Kelly | F01D 5/16 415/119 |
| 8,727,716 B2 | 5/2014 | Clements et al. | |
| 9,097,125 B2 | 8/2015 | Ghorbani Zarimahalleh et al. | |
| 9,650,915 B2 * | 5/2017 | Calza | F01D 5/16 |
| 2002/0064458 A1 | 5/2002 | Montgomery et al. | |
| 2002/0067991 A1 | 6/2002 | Montgomery et al. | |
| 2007/0020101 A1 | 1/2007 | Balamucki et al. | |
| 2008/0134504 A1 | 6/2008 | Schoenenborn | |
| 2010/0247310 A1 | 9/2010 | Kelly et al. | |
| 2011/0044818 A1 | 2/2011 | Kuhne et al. | |
| 2012/0057982 A1 | 3/2012 | O'Hearn et al. | |
| 2012/0148401 A1 | 6/2012 | Kulathu et al. | |
| 2013/0078084 A1 | 3/2013 | Gendrich et al. | |
| 2013/0142659 A1 | 6/2013 | Glaspey | |
| 2013/0170947 A1 | 7/2013 | Kurt-Elli et al. | |
| 2013/0189111 A1 | 7/2013 | Woehler et al. | |
| 2013/0195652 A1 | 8/2013 | Pope | |
| 2014/0050590 A1 | 2/2014 | Ghorbani et al. | |
| 2014/0090380 A1 | 4/2014 | Aggarwala et al. | |
| 2015/0110604 A1 | 4/2015 | Calza et al. | |
| 2015/0139789 A1 | 5/2015 | Schoenenborn | |
| 2015/0260046 A1 | 9/2015 | Broszat et al. | |
| 2015/0322803 A1 | 11/2015 | Fulayter et al. | |
| 2016/0017796 A1 | 1/2016 | Xu et al. | |
| 2016/0238034 A1 | 8/2016 | Fulayter et al. | |
| 2017/0159465 A1 | 6/2017 | Schlemmer et al. | |
| 2017/0175761 A1 | 6/2017 | Schwarz et al. | |
| 2017/0175776 A1 | 6/2017 | Theratil et al. | |
| 2018/0038382 A1 | 2/2018 | Foster | |
| 2018/0080450 A1 | 3/2018 | Glavicic | |
| 2018/0231021 A1 * | 8/2018 | Wilson | F01D 5/16 |
| 2019/0101002 A1 | 4/2019 | Duffin et al. | |

FOREIGN PATENT DOCUMENTS

| | | |
|---|---|---|
| EP | 1211383 | 6/2002 |
| EP | 1746249 | 1/2007 |
| EP | 1813773 | 8/2007 |
| EP | 1985803 | 10/2008 |
| WO | 2014/070279 | 5/2014 |
| WO | 2015/041758 | 3/2015 |

OTHER PUBLICATIONS

European Search Report of Application No. 18194634.4 dated Jan. 29, 2019.
European Search Report of Application No. 18194363.0 dated Feb. 11, 2019.
European Search Report of Application No. 18194668.2 dated Mar. 1, 2019.
European Search Report of Application No. 18194666.6 dated Feb. 21, 2019.

* cited by examiner

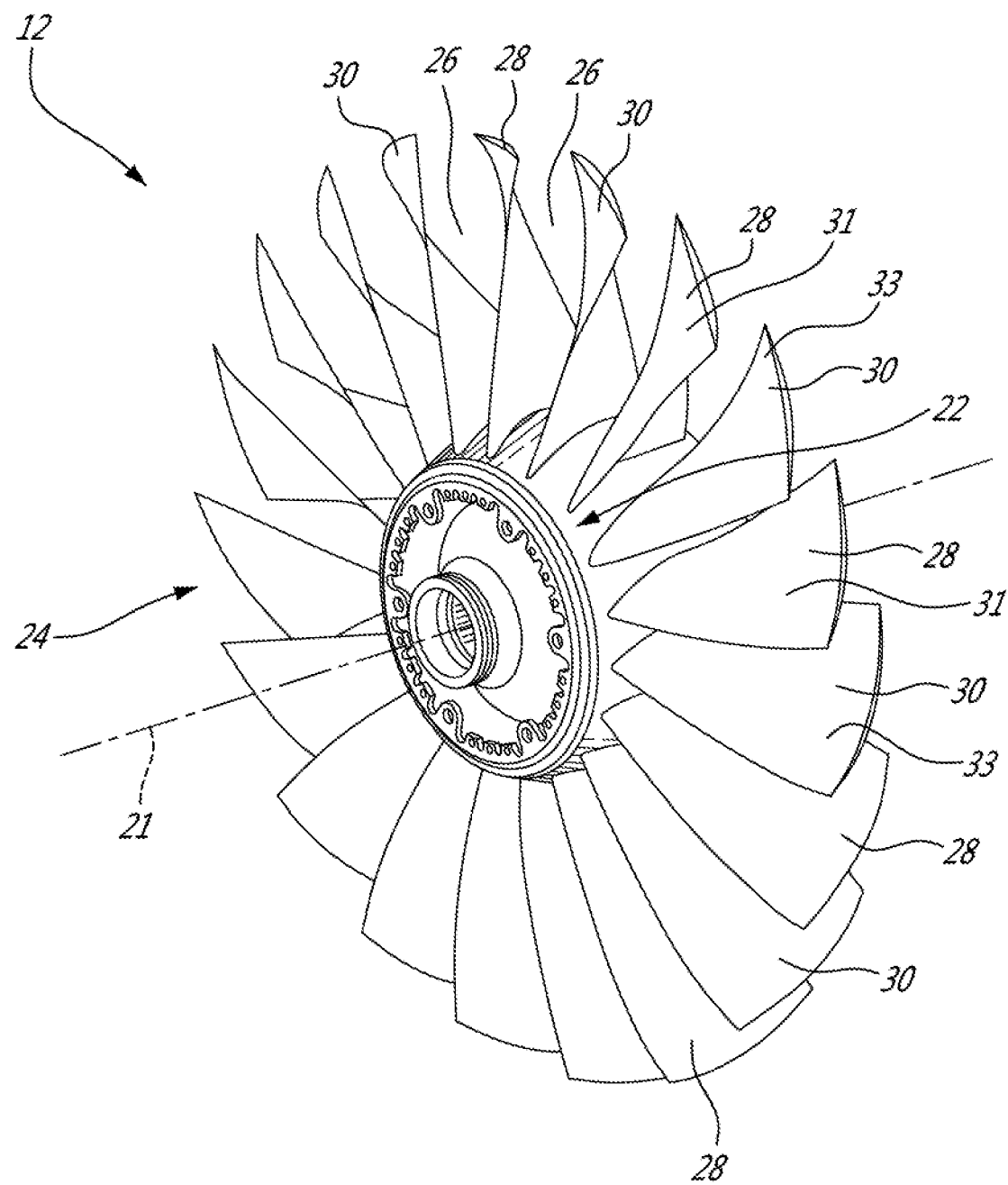

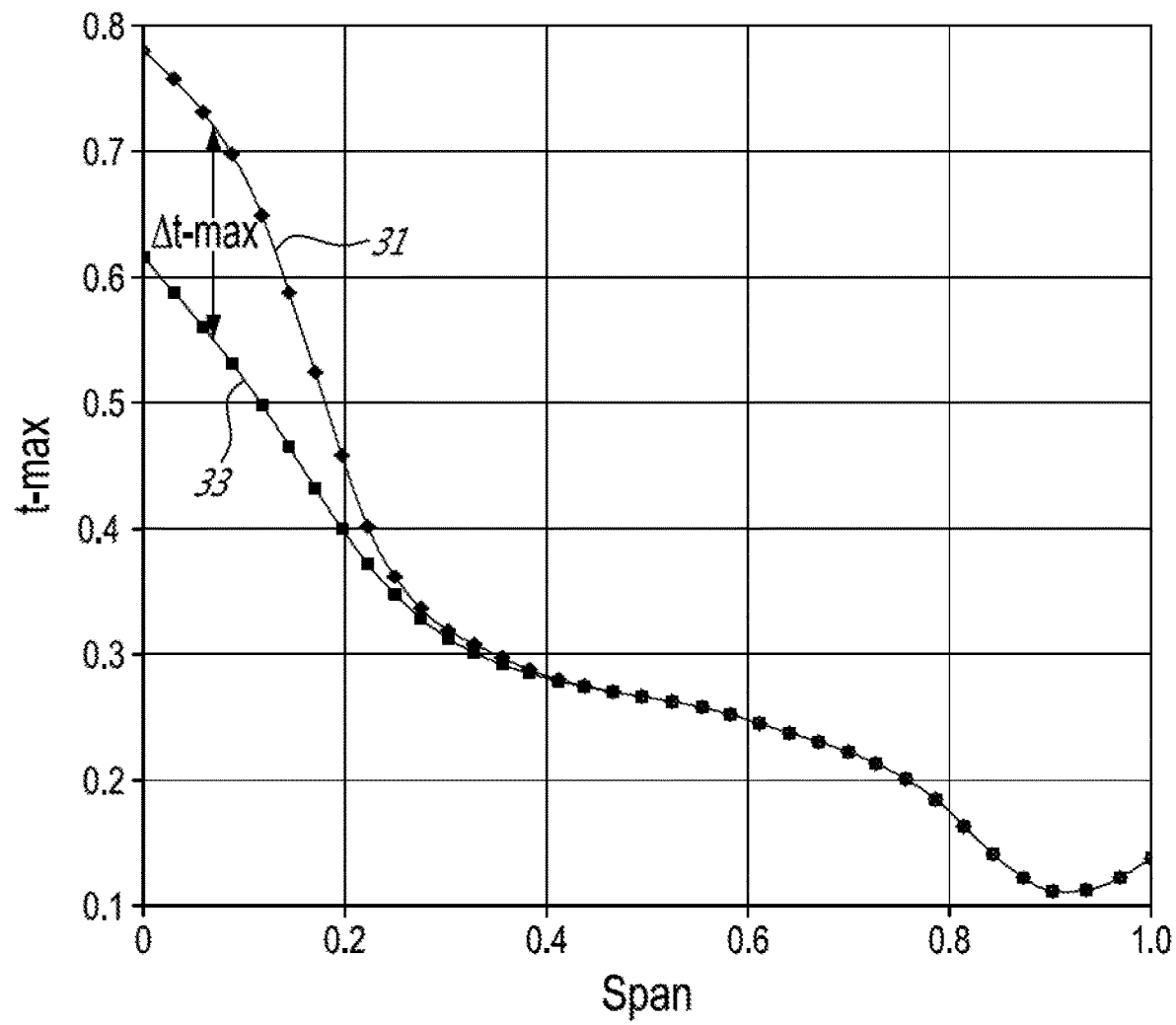

MISTUNED ROTOR FOR GAS TURBINE ENGINE

TECHNICAL FIELD

The application relates generally to rotating airfoils for gas turbine engines, and more particularly to mistuned compressor rotors.

BACKGROUND

Aerodynamic and/or vibrational instabilities, such as but not limited to flutter, can occurs in a gas turbine engine when two or more adjacent blades of a rotor of the engine, such as the fan, vibrate at a frequency close to their natural frequency and the interaction between adjacent blades maintains and/or strengthens such vibration. Other types of aerodynamic instability, such as resonant response, may also occur and are undesirable. Prolonged operation of a rotor undergoing such instabilities can cause airfoil stress loads to exceed acceptable levels for operation. Various attempts have been made to mistune adjacent blades of such rotors so as to separate their natural frequencies and reduce the likelihood of undesirable instabilities.

SUMMARY

In one aspect, there is provided a rotor for a gas turbine engine, the rotor comprising blades circumferentially distributed around a hub, the blades having airfoils with a span defined between a root and tip of the airfoils, the airfoils having a chord defined between a leading edge and a trailing edge of the airfoils, the airfoils having a thickness defined between a pressure side surface and suction side surface of the airfoils, the blades including first blades and second blades interleaved about the rotor, the airfoil of the first blades having a first thickness distribution along the span defining a first natural vibration frequency of the airfoils of the first blades, the airfoil of the second blades having a second thickness distribution along the span defining a second natural vibration frequency different than the first natural vibration frequency, the first thickness distribution being different than the second thickness distribution along a radially-inner half of the span, and the first thickness distribution matching the second thickness distribution along a radially-outer half of the span.

In another aspect, there is provided a fan for a gas turbine engine, the fan comprising blades circumferentially distributed around a hub, the blades having airfoils with a span defined between a root and tip of the airfoils, the airfoils having a chord defined between a leading edge and trailing edge of the airfoils, the airfoils having a thickness defined between a pressure side surface and suction side surface of the airfoils, the blades including first blades and second blades interleaved about the rotor, the airfoil of the first blades having a first thickness distribution along the span defining a first natural vibration frequency of the airfoils of the first blades, the airfoil of the second blades having a second thickness distribution along the span of the airfoil defining a second natural vibration frequency different than the first natural vibration frequency, the first thickness distribution being different than the second thickness distribution along a radially-inner half of the span, the first thickness distribution matching the second thickness distribution along a radially-outer half of the span.

In a further aspect, there is provided a method of forming a rotor of a gas turbine engine, the method comprising: providing first blades and second blades, the first blades having a first thickness distribution defining a first natural vibration frequency, the second blades having a second thickness distribution defining a second natural vibration frequency different than the first natural vibration frequency, the first thickness distribution being different than the second thickness distribution along a radially-inner half of the first and second blades, the first thickness distribution matching the second thickness distribution along a radially-outer half of the first and second blades; positioning at least one of the second blades relative to a hub of the rotor to be circumferentially between two of the first blades; and fastening the first and second blades to the hub.

BRIEF DESCRIPTION OF THE DRAWINGS

Reference is now made to the accompanying figures in which:

FIG. 2 is a perspective view of a fan rotor of the gas turbine engine shown in FIG. 1;

FIG. 5 is a plot of a maximum thickness (t-max) versus a span for two airfoils.

DETAILED DESCRIPTION

Figure 1:
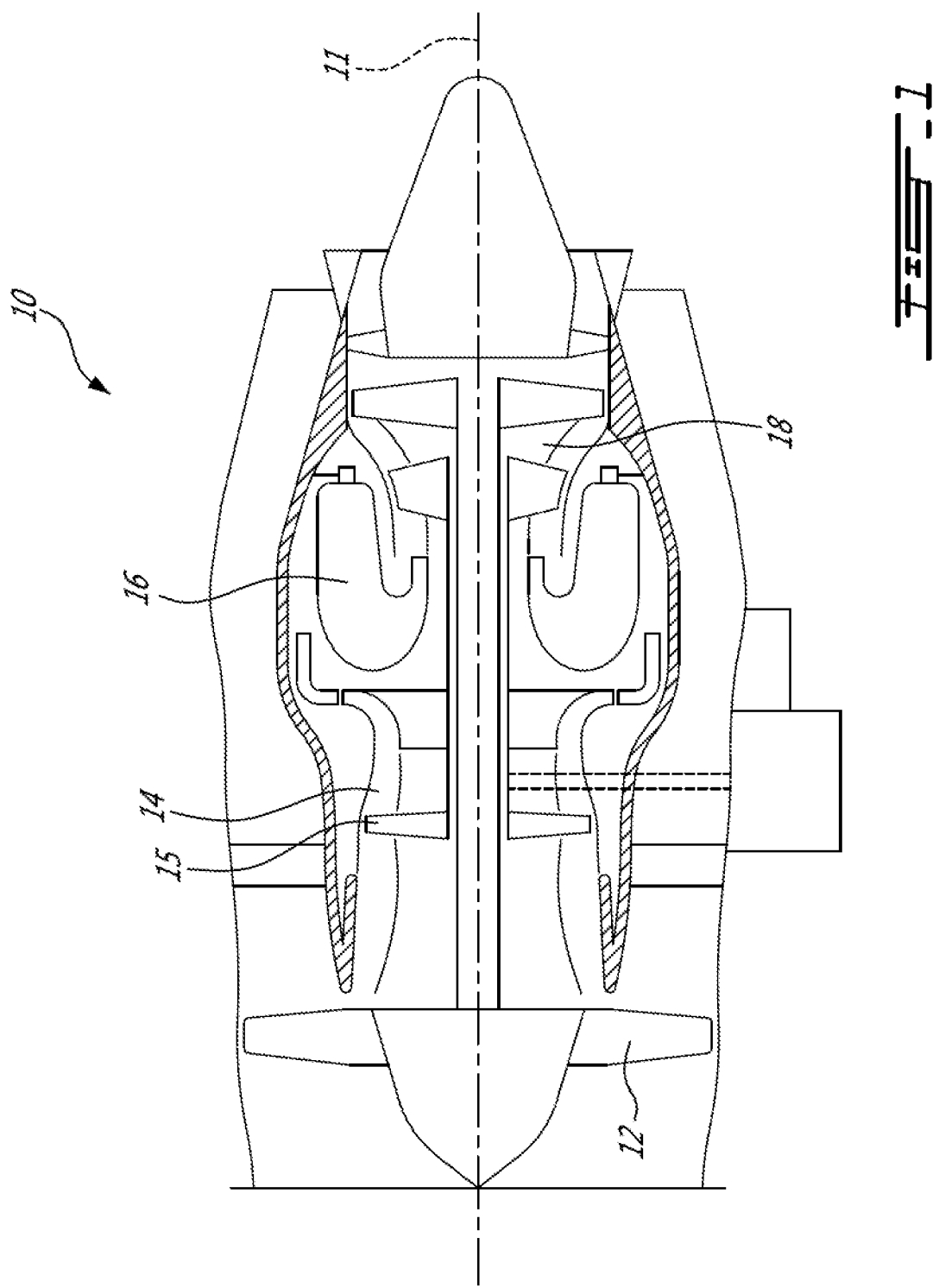
FIG. 1 is a schematic cross-sectional view of a gas turbine engine.

FIG. 1 illustrates a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. Although the example below is described as applied to a fan of a turbofan engine, it will be understood the present teachings may be applied to any suitable gas turbine compressor rotor.

As shown in more detail in FIG. 2, the fan 12 includes a central hub 22, which in use rotates about an axis of rotation 21, and a circumferential row of fan blades 24 that are circumferentially distributed and which project a length from the hub 22 in a span-wise direction (which may be substantially radial). The axis of rotation 21 of the fan 12 may be coaxial with the main engine axis 11 of the engine 10 as shown in FIG. 1. In the embodiment of FIG. 2, the fan 12 is an integrally bladed rotor or fan (IBF), wherein the fan blades 24 are integrally formed with the hub 22. In an alternate embodiment, the fan 12 is a bladed rotor where the fan blades 24 are separately formed and fixed in place on the hub 22. Each circumferentially adjacent pair of fan blades 24 defines an inter-blade passage 26 there-between for the working fluid.

The circumferential row of fan blades 24 of the fan 12 includes two or more different types of fan blades 24, in the sense that a plurality of sets of fan blades are provided, each set having airfoils with non-trivially different shapes, which difference will be described in more details below and illustrated in further figures. Flow-induced resonance refers to a situation where, during operation, adjacent vibrating blades transfer energy back and forth through the air medium, which energy continually maintains and/or strengthens the blades' natural vibration mode. Fan blades have a number of oscillation patterns, any of which, if it gets excited and goes into resonance, can result in flow induced resonance issues. The two or more different types of fan blades 24 are composed, in this example, of successively circumferentially alternating sets of fan blades, each set including at least a first blade 28 and a second blade 30 (the first and second blades 28,30 respectively have airfoils 31,33 which are different from one another, as described in further detail below). The different profiles of the first and second blades 28,30 provide a natural vibrational frequency separation or difference between the adjacent blades 28,30, which may be sufficient to reduce or impede unwanted resonance between the blades. Regardless of the exact amount of frequency separation, the first and second fan blades 28,30 are therefore said to be intentionally "mistuned" relative to each other, in order to reduce the occurrence and/or delay the onset, of flow-induced resonance.

In the exemplarity embodiment of FIG. 2, the fan 12 therefore includes circumferentially alternating sets of fan blades 24, each set including two different fan blade types, namely first and second blades 28,30, that are distributed about the circumference of the hub 22 to provide the circumferential row of fan blades 24. It is to be understood, however, that each of these sets of fan blades 24 may include more than two different blade types, and need not comprise pairs, or even numbers, of blade types. For example, each set of fan blades 24 may include three or more fan blades which differ from each other (e.g. a circumferential distribution of the fan blades may include, in circumferentially successive order, blade types: A, B, C, A, B, C; or A, B, C, D, A, B, C, D, etc., wherein each of the capitalized letters represent different types of blades as described above). In another possible embodiment, the row of fan blades 24 only has only one second blade 30, and all the other blades of the row of fan blades 24 are first blades 28.

The embodiment of FIG. 2 includes, for the sake of simplicity of explanation, a fan 20 having an interleaved set of fan blades composed of only two different blade types, namely first blades 28 (e.g. blade type "A") and second blades 30 (e.g. blade type "B"). The second blades 30 are circumferentially positioned between two of the first blades 28. This constitutes, accordingly, a circumferential distribution of fan blades in this example which follows a circumferential sequence of blade types A, B, A, B, etc. However, any of the alternate arrangements as described above may also be provided.

Figure 3A:
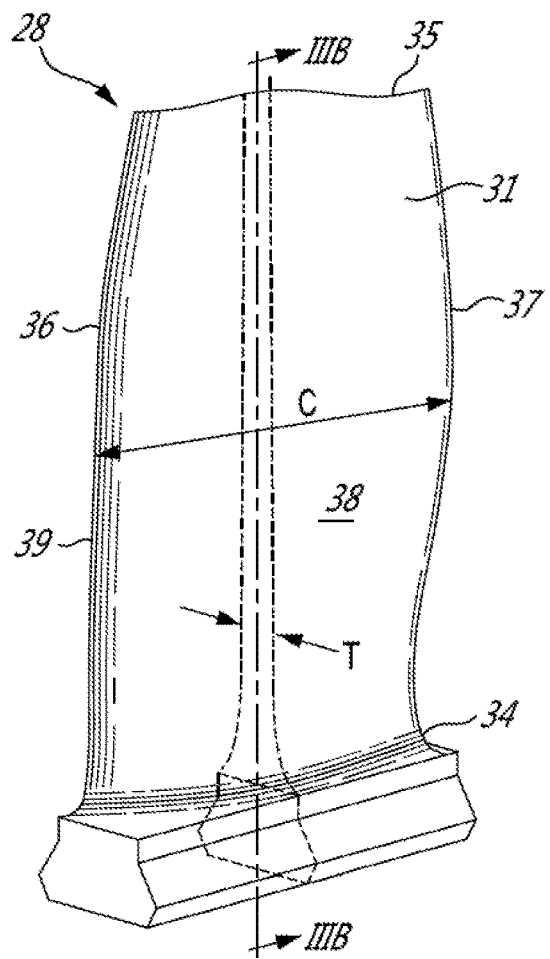
FIG. 3A is a perspective view of one of the blades of the fan rotor of FIG. 2.
Figure 3C:
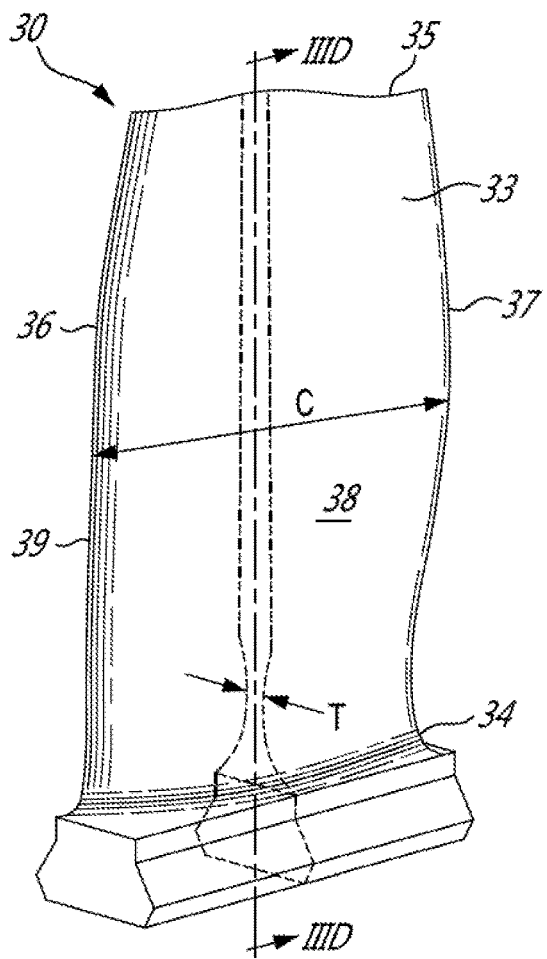
FIG. 3C is a perspective view of another one of the blades of the fan rotor of FIG. 2.
Figure 3B:
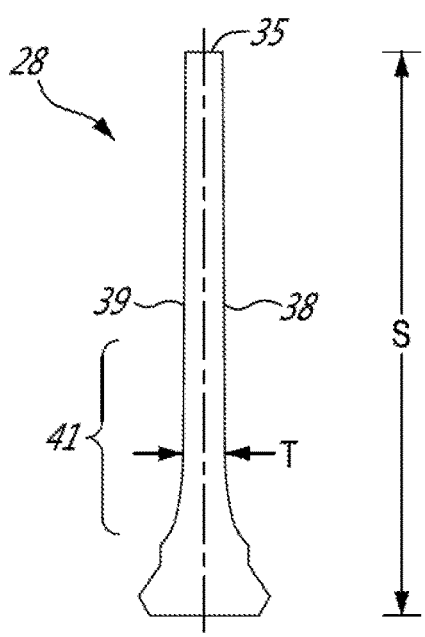
FIG. 3B is a cross-sectional view of the blade of FIG. 3A having a first thickness distribution and taken along the line IIIB-IIIB.
Figure 3D:
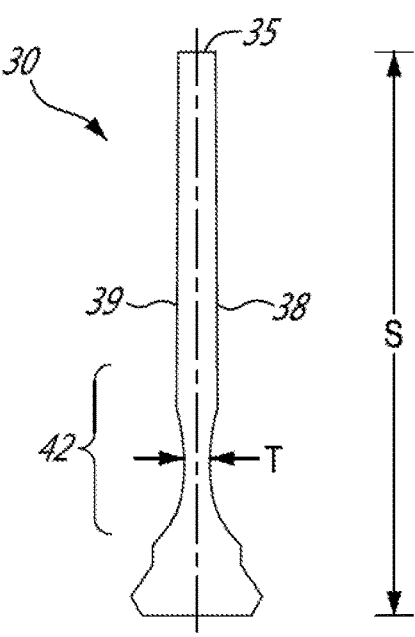
FIG. 3D is a cross-sectional view of the blade of FIG. 3C having a second thickness distribution and taken along the line IIID-IIID.

FIGS. 3A and 3B show an embodiment of one of the first blades 28, and FIGS. 3C and 3D show an embodiment of one of the second blades 30 of the row of fan blades 24. Each of the airfoils 31,33 of the first and second blades 28,30 has a radial span S, a chord C, and a thickness T. The span S extends between the root 34 and the tip 35 of each of the airfoils 31,33, in a direction that is substantially radial to the axis of rotation 21 of the fan 12. The 0% span position is located at the root 34 of each airfoil 31,33, and the 100% span position is located at the tip 35 of each airfoil 31,33. The chord C extends between the leading edges 36 and the trailing edges 37 of each of the airfoils 31,33. The position 0% chord C is located at the leading edge 36 of each airfoil 31,33, and the position 100% chord C is located at the trailing edge 37 of each airfoil 31,33. The thickness T of the airfoils 31,33 is defined between the pressure side surface 38 and the suction side surface 39 of each of the airfoils 31,33. For the airfoils 31,33 of the depicted embodiment, the thickness T varies along the span S.

The airfoil 31 of the first blade 28 has a first thickness distribution, and the airfoil 33 of the second blade 30 has a second thickness distribution. Each of the first and second thickness distributions is the profile of the thickness T of the first and second blades 28,30, respectively, spread over the span S of the first and second blades 28,30. The first and second thickness distributions provide a different profile to the first and second blades 28,30, respectively, and thus provide a natural vibrational frequency separation or difference between the adjacent blades 28,30. Stated differently, the first thickness distribution defines a first natural frequency for the first blades 28 that is different than a second natural frequency of the second blades 30 defined by the second thickness distribution. The first and second fan blades 28,30 are therefore "mistuned" relative to each other by varying the thickness T along the span S of the first and second blades 28,30.

As shown in FIG. 3B, the first thickness distribution along the radially-inner half of the span S of the airfoil 31 is referred to as the first radially-inner thickness distribution 41. As shown in FIG. 3D, the second thickness distribution along the radially-inner half of the span S of the airfoil 33 is referred to as the second radially-inner thickness distribution 42. The first radially-inner thickness distribution 41 is different than the second radially-inner thickness distribution 42. Each of the first and second radially-inner thickness distributions 41,42 is the profile of the thickness T of the first and second blades 28,30, respectively, spread over the radially-inner half of the first and second blades 28,30. The radially-inner half of the span S of the airfoils 31,33 extends between a 0% span position at the root 34 of the airfoils 31,33 and at most a 50% span position of the airfoils 31,33.

In the depicted embodiment, the thickness distributions 41,42 of the airfoils 31,33 along the radially-inner half of the span S extend between a 0% span position at the root 34 of the airfoils 31,33 and a 45% span position. The distribution of the thickness T therefore varies along a segment of the airfoils 31,33 from their roots 34 to roughly mid span S. The thickness T of the airfoils 31,33 in the depicted embodiment is therefore only varied along their "lower" or radially-inner portions which are expected to be less aerodynamically sensitive than other portions of the first and second blades 28,30. Still referring to FIGS. 3A to 3D, the radially-outer half of the spans S of the airfoils 31,33 have matching thickness distributions. The term "matching", as used herein with respect to the thickness distributions of the radially-outer halves of the spans of the airfoils, is understood to mean that the radially-outer half of the spans S of the airfoils 31,33 have an aerodynamic shape and thickness such that there is a negligible difference in the aerodynamic performance of the airfoils 31,33 along their radially-outer halves. There may also be a negligible difference in the vibratory response of the airfoils 31,33 along their radially-outer halves. In the depicted embodiment, the radially-outer half of the spans S of the airfoils 31,33 have an identical distribution of thickness T. The radially-outer or "top" halves of the first and second blades 28,30 therefore have an identical thickness profile and aerodynamic shape, however it is understood that negligible differences in the thickness profiles or shape might be possible without causing any significant differences in their aerodynamic performance and/or vibratory response. Therefore, in the depicted embodiment, only the radially-inner segment of the first and second blades 28,30 is varied in thickness T in order to mistune the first and second blades 28,30.

Figure 4A:
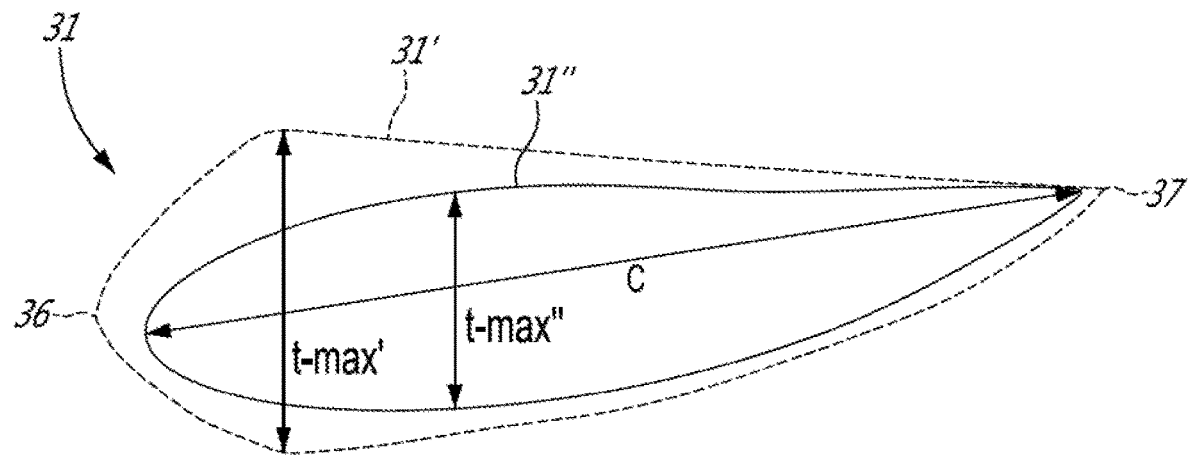
FIG. 4A is a cross-sectional view of a blade having a first thickness distribution.
Figure 4B:
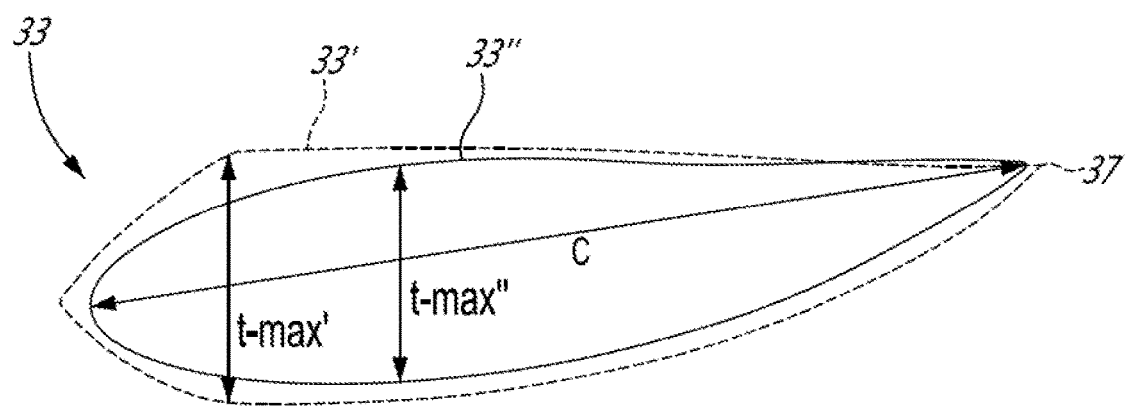
FIG. 4B is a cross-sectional view of a blade having a second thickness distribution.

Referring to FIGS. 4A and 4B, a maximum thickness, referred to herein as "t-max", has a different position along the chord C at different span-wise locations of the airfoils 31,33. The maximum thickness t-max is the largest value of the thickness T of the airfoils 31,33 at a given location along the span S. Each span-wise segment of the airfoils 31,33 therefore has only one t-max value, which has a position along the chord C. FIG. 4A shows a cross-section of the airfoil 31 of the first blade 28 taken in two planes that are parallel to the chord C: the first plane 31' (shown in dotted lines) sections the airfoil 31 at the root 34, and the second plane 31" (shown in solid lines) sections the airfoil 31 at the tip 35. FIG. 4B shows a cross-section of the airfoil 33 of the second blade 28 taken in the same two planes 33',33" that are parallel to the chord C. The maximum thickness t-max is a defining feature of the thickness distributions 41,42.

In the depicted embodiment, the value of t-max for the airfoil 31 at a given location on the span S may be different from the value of t-max for the airfoil 33 at the same location on the span S. Stated differently, the value of t-max at some span-wise locations varies between the first and second blades 28,30. At the roots 34 of the airfoils 31,33, a position corresponding to roughly 0% of the span S, t-max is located at a first position on the chord C of about 35% of the chord C, as shown in the first planes 31',33'. At the tips 35 of the airfoils 31,33, a position corresponding to roughly 100% of the span S, t-max is located at a second location on the chord C of about 55% of the chord C, as shown in the second planes 31",33". In the depicted embodiment, therefore, t-max is at the same location on the chord C for both the first and second blades 28,30 at theirs roots 34 and their tips 35. It can thus be appreciated that the maximum thickness t-max for each airfoil 31,33 shifts towards the trailing edges 37 of the airfoils 31,33 radially-outwardly from their roots 34. The chord C location of t-max therefore shifts toward the trailing edge 37 as the span S increases radially-outwardly, from the root 34 to the tip 35 of the airfoils 31,33.

As can be seen by comparing FIGS. 4A and 4B, the location on the chord C of t-max at the roots 34 of the airfoils 31,33 (in the planes 31',33') is the same, but the values of t-max are different. More particularly, the value of t-max' for the airfoil 31 is greater than t-max' for the airfoil 33 (in the planes 31',33'). As can also be seen by comparing FIGS. 4A and 4B, the location on the chord C of t-max" at the tips 35 of the airfoils 31,33 (in the planes 31",33") is the same, and the values of t-max" are also the same.

FIG. 5 is a plot of t-max as a function of span S for each of the airfoils 31,33 of the first and second blades 28,30. The values for t-max and the span S are normalized. A difference in the t-max of the airfoils 31,33 is Δt-max. The Δt-max has a value greater than 0 in the radially-inner half of the spans S of the airfoils 31,33. More particularly, and as shown in FIG. 5, Δt-max has a value greater than 0 between a 0% span position and a 45% span position of the spans of the airfoils of the first and second blades. More particularly, Δt-max has a value greater than 0 between a 0% span position and a 25% span position. Δt-max is largest at the 0% span position of the airfoils 31,33, There is therefore a difference in t-max between the first and second blades 28,30 at least along the radially-inner half of the first and second blades 31,33. FIG. 5 shows that Δt-max has a value substantially equal to 0 between a 25% span position and a 100% span position of the airfoils 31,33. A large portion of the radially-outer span of the first and second blades 28,30 has the same t-max.

Referring to FIGS. 2 to 3D, there is also disclosed a method of forming the rotor 12. The method includes providing the first and second blades 28,30 with their respective thickness distributions defining the different first and second natural vibration frequencies. The method includes positioning at least one of the second blades 30 relative to the hub 22 of the rotor 12 to be circumferentially between two of the first blades 38. The method also includes fastening, either by removably attaching, welding, or integrally forming, the first and second blades 28,30 to the hub 22. In order to increase the difference between the first and second natural vibration frequencies, the method includes increasing a difference between the t-max of the first blades 28 and the t-max of the second blades 30 along the radially-inner half of the first and second blades 28,30.

The rotor disclosed herein has A and B mistuned blades 28,30 for use on a single rotor, where the frequency separation of the blades 28,30 is accomplished by having different t-max and thickness distributions 41,42 in the lower half of the span S.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure, and such modifications are intended to fall within the appended claims.

The invention claimed is:

1. A rotor for a gas turbine engine, the rotor comprising blades circumferentially distributed around a hub, the blades having airfoils with a span defined between a root and tip of the airfoils, the airfoils having a chord defined between a leading edge and a trailing edge of the airfoils, the airfoils having a thickness defined between a pressure side surface and suction side surface of the airfoils, the blades including first blades and second blades interleaved about the rotor, the airfoil of the first blades having a first thickness distribution along the span defining a first natural vibration frequency of the airfoils of the first blades, the airfoil of the second blades having a second thickness distribution along the span defining a second natural vibration frequency different than the first natural vibration frequency, the first thickness distribution being different than the second thickness distribution along a radially-inner portion of the span, and the first thickness distribution matching the second thickness distribution along a radially-outer portion of the span extending from a 50% span position to a 100% span position, the first and second thickness distributions having a maximum thickness (t-max') at the root of the airfoils located at a first position on the chord, and the first and second thickness distributions having a maximum thickness (t-max") at the tip of the airfoils located at a second position on the chord different than the first position, wherein Δt-max is the difference between the maximum thickness of the airfoils of the first blades and the maximum thickness of the airfoils of the second blades, and the Δt-max is largest at a 0% span position of the airfoils of the first and second blades.

2. The rotor as defined in claim 1, wherein the second position on the chord is closer to the trailing edge than the first position on the chord.

3. The rotor as defined in claim 2, wherein the first position on the chord is 35% of the chord, and the second position on the chord is 55% of the chord.

4. The rotor as defined in claim 1, wherein the Δt-max has a value greater than 0 between a 0% span position and a 45% span position of the span of the airfoil of the first and second blades.

5. The rotor as defined in claim 4, wherein the Δt-max has a value greater than 0 between the 0% span position and a 25% span position of the span of the airfoil of the first and second blades.

6. The rotor as defined in claim 1, wherein the Δt-max has a value substantially equal to 0 between a 25% span position and the 100% span position of the span of the airfoil of the first and second blades.

7. The rotor as defined in claim 1, wherein the radially-inner portion of the span of the airfoils of the first and second blades extends between the 0% span position and a 45% span position.

8. The rotor as defined in claim 1, wherein the first position on the chord of the maximum thickness (t-max') at the root of the airfoils is the same for the first and second blades.

9. A fan for a gas turbine engine, the fan comprising blades circumferentially distributed around a hub, the blades having airfoils with a span defined between a root and tip of the airfoils, the airfoils having a chord defined between a leading edge and trailing edge of the airfoils, the airfoils having a thickness defined between a pressure side surface and suction side surface of the airfoils, the blades including first blades and second blades interleaved about the rotor, the airfoil of the first blades having a first thickness distribution along the span defining a first natural vibration frequency of the airfoils of the first blades, the airfoil of the second blades having a second thickness distribution along the span of the airfoil defining a second natural vibration frequency different than the first natural vibration frequency, the first thickness distribution being different than the second thickness distribution along a radially-inner portion of the span, the first thickness distribution matching the second thickness distribution along a radially-outer portion of the span extending from a 50% span position to a 100% span position, the first and second thickness distributions having a maximum thickness (t-max') at the root of the airfoils located at a first position on the chord, and the first and second thickness distributions having a maximum thickness (t-max") at the tip of the airfoils located at a second position on the chord different than the first position, wherein a Δt-max is the difference between the maximum thickness of the airfoil of the first blades and the maximum thickness of the airfoil of the second blades, and the Δt-max is largest at a 0% span position of the airfoils of the first and second blades.

10. The rotor as defined in claim 9, wherein the maximum thickness (t-max') at the root of the airfoil is located at 35% of the chord, and the maximum thickness (t-max") at the tip of the airfoil is located at 55% of the chord.

11. The fan as defined in claim 9, wherein the Δt-max has a value greater than 0 between a 0% span position and a 45% span position of the span of the airfoil of the first and second blades.

12. The fan as defined in claim 9, wherein the fan is an integrally-bladed fan.

13. A method of forming a rotor of a gas turbine engine, the method comprising:
providing first blades and second blades, the first blades having a first thickness distribution defining a first natural vibration frequency, the second blades having a second thickness distribution defining a second natural vibration frequency different than the first natural vibration frequency, the first thickness distribution being different than the second thickness distribution along a radially-inner portion of the first and second blades, the first thickness distribution matching the second thickness distribution along a radially-outer portion of the first and second blades extending from a 50% span position to a 100% span position, the first and second thickness distributions having a maximum thickness (t-max') at a root of the first and second blades located at a first position on a chord of the first and second blades, and the first and second thickness distributions having a maximum thickness (t-max") at a tip of the first and second blades located at a second position on the chord different than the first position, and defining a difference between the maximum thickness of the first blade thickness distribution and the maximum thickness of the second blade thickness distribution being defined as Δt-max, the Δt-max being largest at a 0% span position of the airfoils of the first and second blades;
positioning at least one of the second blades relative to a hub of the rotor to be circumferentially between two of the first blades; and
fastening the first and second blades to the hub.

14. The method as defined in claim 13, wherein providing the first blades and the second blades includes adjusting a difference between the first and second natural vibration frequencies by increasing the difference between the maximum thickness of the first blades and the maximum thickness of the second blades along the radially-inner portion of the first and second blades.

\* \* \* \* \*